US012338104B2

(12) United States Patent
Erickson

(10) Patent No.: US 12,338,104 B2
(45) Date of Patent: Jun. 24, 2025

(54) TAG LINE RELEASE ASSEMBLY

(71) Applicant: Walter Erickson, Long Beach, CA (US)

(72) Inventor: Walter Erickson, Long Beach, CA (US)

( * ) Notice: Subject to any disclaimer, the term of this patent is extended or adjusted under 35 U.S.C. 154(b) by 416 days.

(21) Appl. No.: 18/088,133

(22) Filed: Dec. 23, 2022

(65) Prior Publication Data

US 2024/0208776 A1 Jun. 27, 2024

(51) Int. Cl.
*B66C 13/08* (2006.01)
*B66C 1/12* (2006.01)

(52) U.S. Cl.
CPC ................ *B66C 13/08* (2013.01); *B66C 1/12* (2013.01)

(58) Field of Classification Search
CPC .. B66C 1/38; B66C 1/12; B66C 13/08; B66C 1/66; B66C 13/40; B64D 17/383; A62B 1/06; A62B 35/005; E06C 1/56
USPC ........................................................ 294/82.35
See application file for complete search history.

(56) References Cited

U.S. PATENT DOCUMENTS 3,104,909 A * 9/1963 Walker ...................... B66C 1/66 294/82.35
3,633,960 A * 1/1972 Drayton .................... B66C 1/12 294/82.35
4,149,746 A 4/1979 Androski
4,441,750 A 4/1984 Reber
5,064,021 A * 11/1991 Bauer ...................... A62B 1/18 182/100
5,580,113 A * 12/1996 Pomerville ............... B66C 1/34 294/82.35
5,762,282 A * 6/1998 Wolner ................ B66D 1/7415 242/390.8
5,791,710 A * 8/1998 Marler ...................... B66C 1/66 294/82.35
5,895,083 A * 4/1999 Bidwell .................... B66C 1/38 294/82.31
7,837,245 B2 * 11/2010 Hailstone ................ B66C 1/105 294/82.35
8,240,728 B2 * 8/2012 Hwang ................... F16G 15/06 294/82.23
9,045,317 B2 * 6/2015 Graf ........................ B66C 13/08
D878,907 S 3/2020 Sotis
(Continued)

FOREIGN PATENT DOCUMENTS

CA 2914258 12/2013
DE 102014002228 A1 * 8/2015 ............ B66C 1/108
(Continued)

*Primary Examiner* — Taylor Morris

(57) ABSTRACT

A tag line release assembly includes a mount that is attachable to a load being lifted by a crane. A disk is disposed on the mount such that the disk extends away from the load when the mount is attached to the load. A release unit is attached to the disk and the release unit is in remote communication with a remote control thereby facilitating the remote control to remotely actuate the release unit between an actuated condition and a de-actuated condition. A cord is attached to the disk and the cord engages the release unit thereby facilitating a tag line to be looped around the cord. The release unit is remotely controlled to release the cord thereby dropping the tag line to facilitate a ground based worker to hold the tag line for guiding the load when the load is being lowered by the crane.

8 Claims, 5 Drawing Sheets

(56) References Cited

U.S. PATENT DOCUMENTS

| | | | | |
|---|---|---|---|---|
| 2004/0032140 | A1* | 2/2004 | Solstad | B66C 13/08 294/81.4 |
| 2008/0024141 | A1 | 1/2008 | Pratt | |
| 2015/0158705 | A1 | 6/2015 | Cottone | |

FOREIGN PATENT DOCUMENTS

| | | | | |
|---|---|---|---|---|
| FR | 3141455 | A1 * | 5/2024 | B66C 13/08 |
| KR | 100626352 | B1 * | 9/2006 | B66C 1/12 |

* cited by examiner

TAG LINE RELEASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

The Names of the Parties to a Joint Research Agreement

Not Applicable

Incorporation-by-Reference of Material Submitted on a Compact Disc or as a Text File Via the Office Electronic Filing System Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tag line devices and more particularly pertains to a new tag line device for storing a tag line on a load being lifted by a crane and subsequently releasing the tag line to a ground based worker. The device includes a mount that is attachable to the load and a release unit that is attached to the mount. The device includes a cord that is attached to the mount and which is releasably engaged by the release unit. A tag line is looped around the cord and the release unit is remotely controlled to release the cord and subsequently drop the tag line to a ground based worker.

(2) Description of Related Art Including Information Disclosed Under 37 CFR 1.97 and 1.98

The prior art relates to tag line devices including a remote controlled safety hook device that includes a hook shaped member pivotally disposed in a housing that is remotely operated for engaging and releasing an object. The prior art discloses a remotely controlled sling device that includes a release unit suspended from a helicopter and a pair of movable hooks disposed in the release unit for holding and subsequently releasing suspension lines. The prior art discloses an insulating rigger device for grounding a tag line to a load thereby inhibiting static discharge.

BRIEF SUMMARY OF THE INVENTION

An embodiment of the disclosure meets the needs presented above by generally comprising a mount that is attachable to a load being lifted by a crane. A disk is disposed on the mount such that the disk extends away from the load when the mount is attached to the load. A release unit is attached to the disk and the release unit is in remote communication with a remote control thereby facilitating the remote control to remotely actuate the release unit between an actuated condition and a de-actuated condition. A cord is attached to the disk and the cord engages the release unit thereby facilitating a tag line to be looped around the cord. The release unit is remotely controlled to release the cord thereby dropping the tag line to facilitate a ground based worker to hold the tag line for guiding the load when the load is being lowered by the crane.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
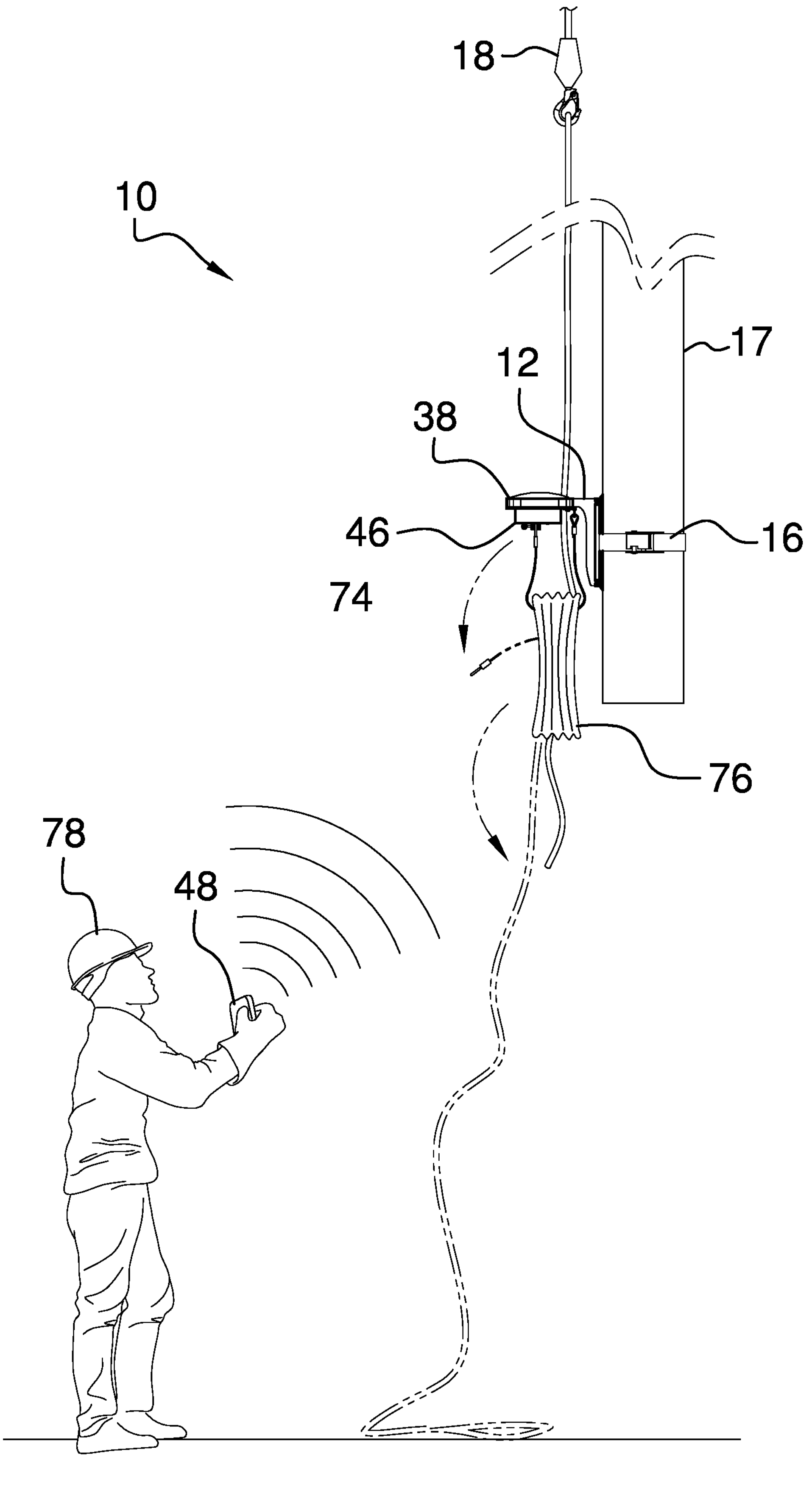
FIG. 1 is a perspective in-use view of a tag line release assembly according to an embodiment of the disclosure.
Figure 2:
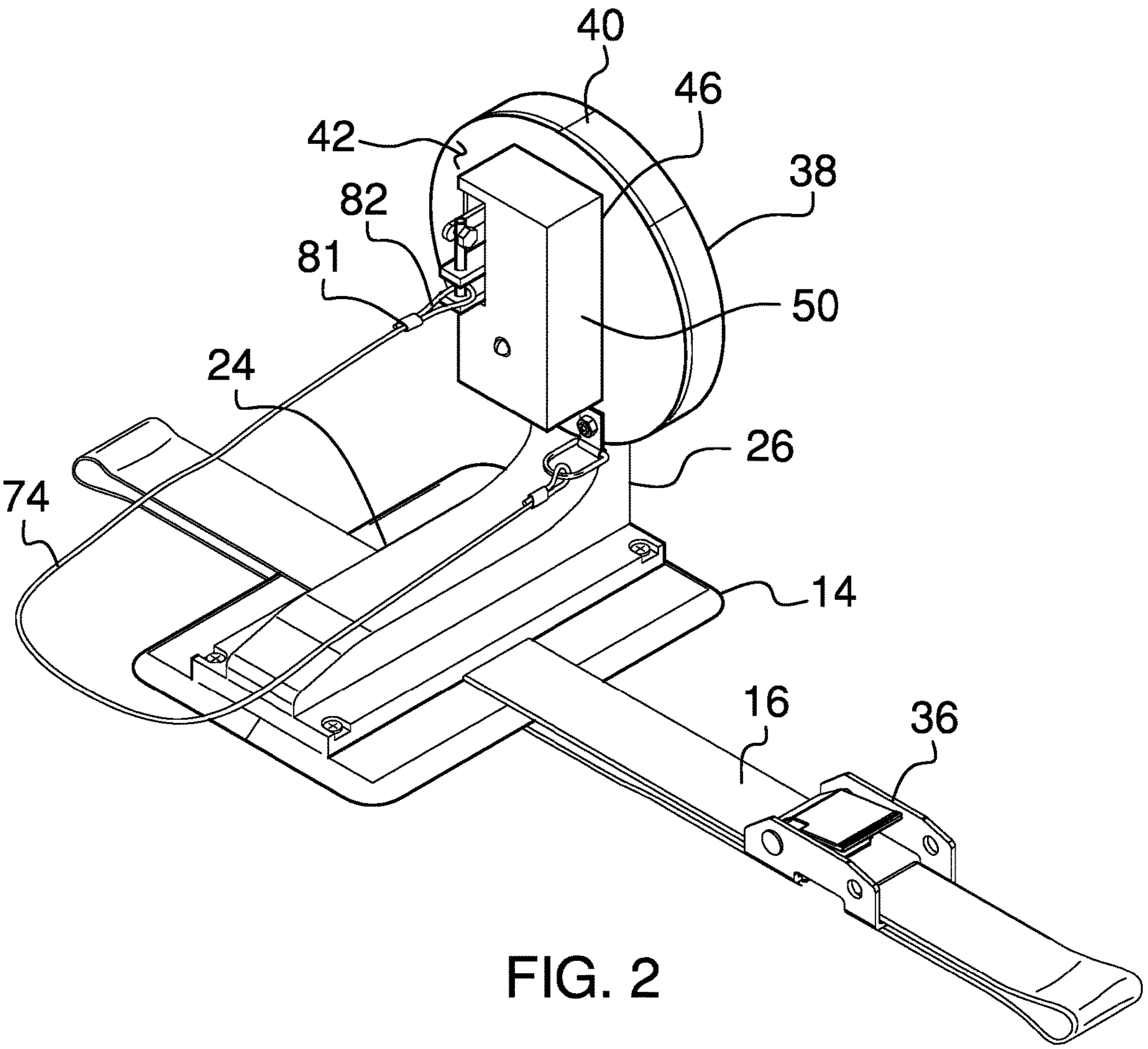
FIG. 2 is a bottom perspective view of an embodiment of the disclosure.
Figure 3:
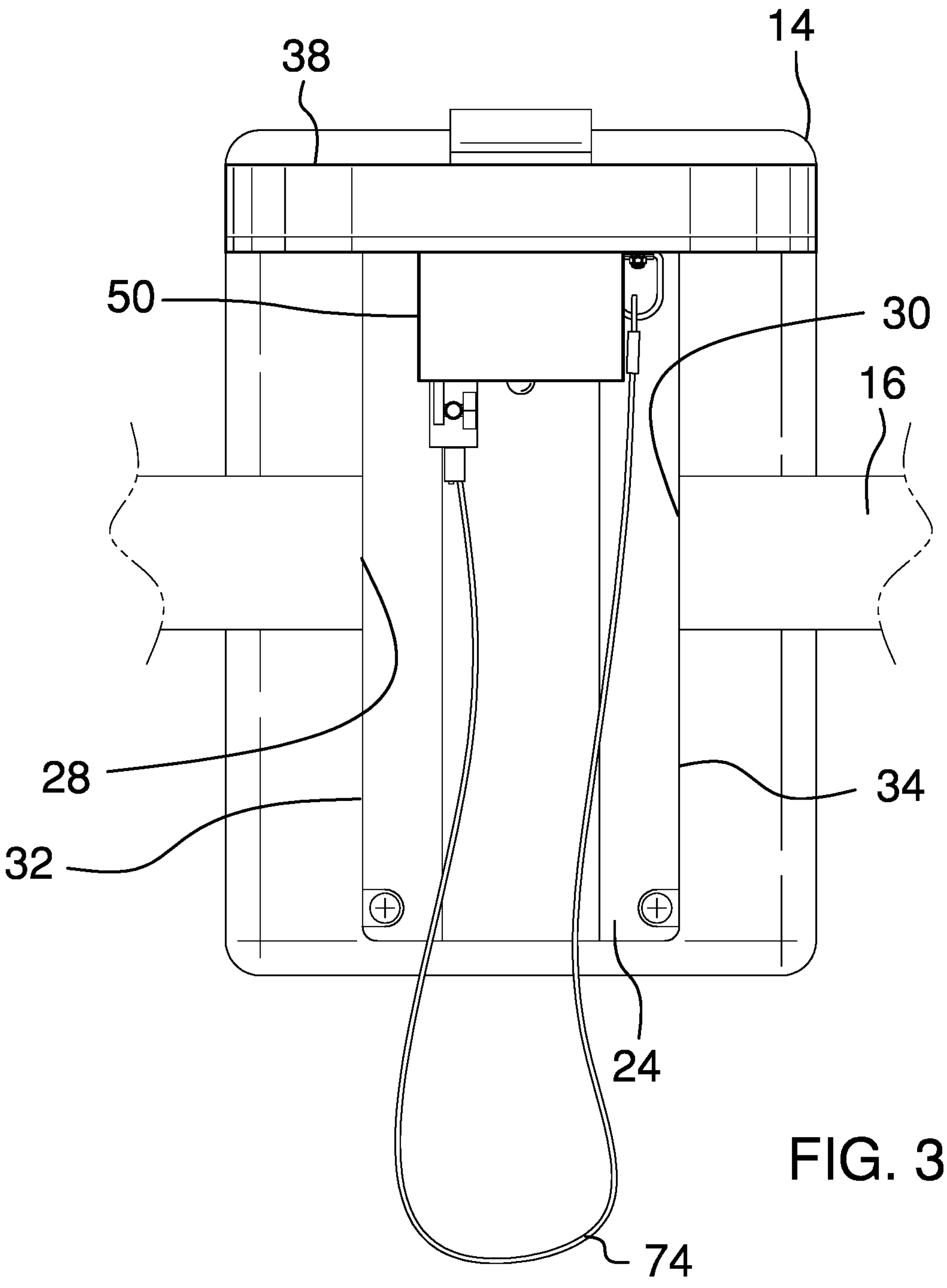
FIG. 3 is a front view of an embodiment of the disclosure.
Figure 4:
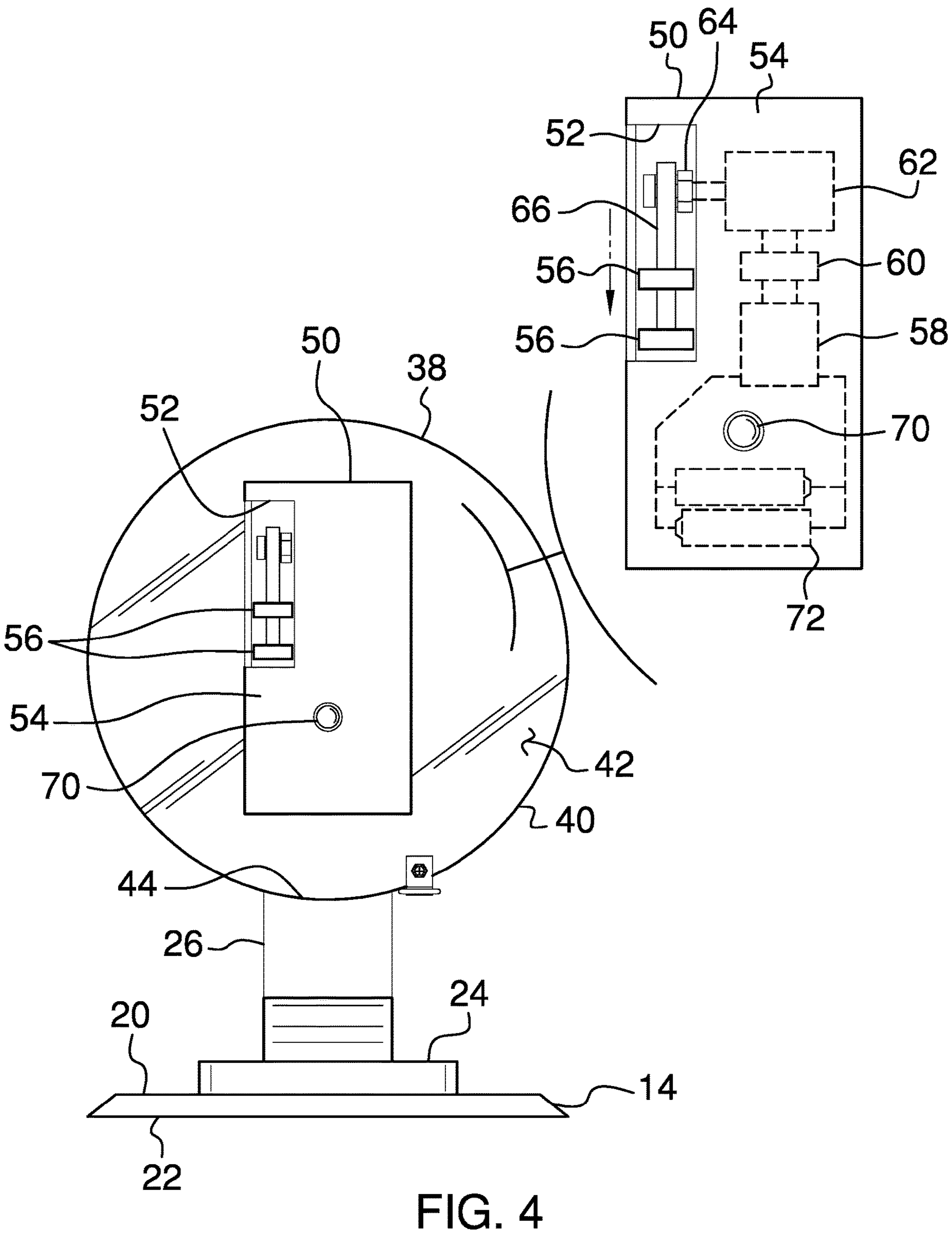
FIG. 4 is a bottom view of an embodiment of the disclosure.
Figure 5:
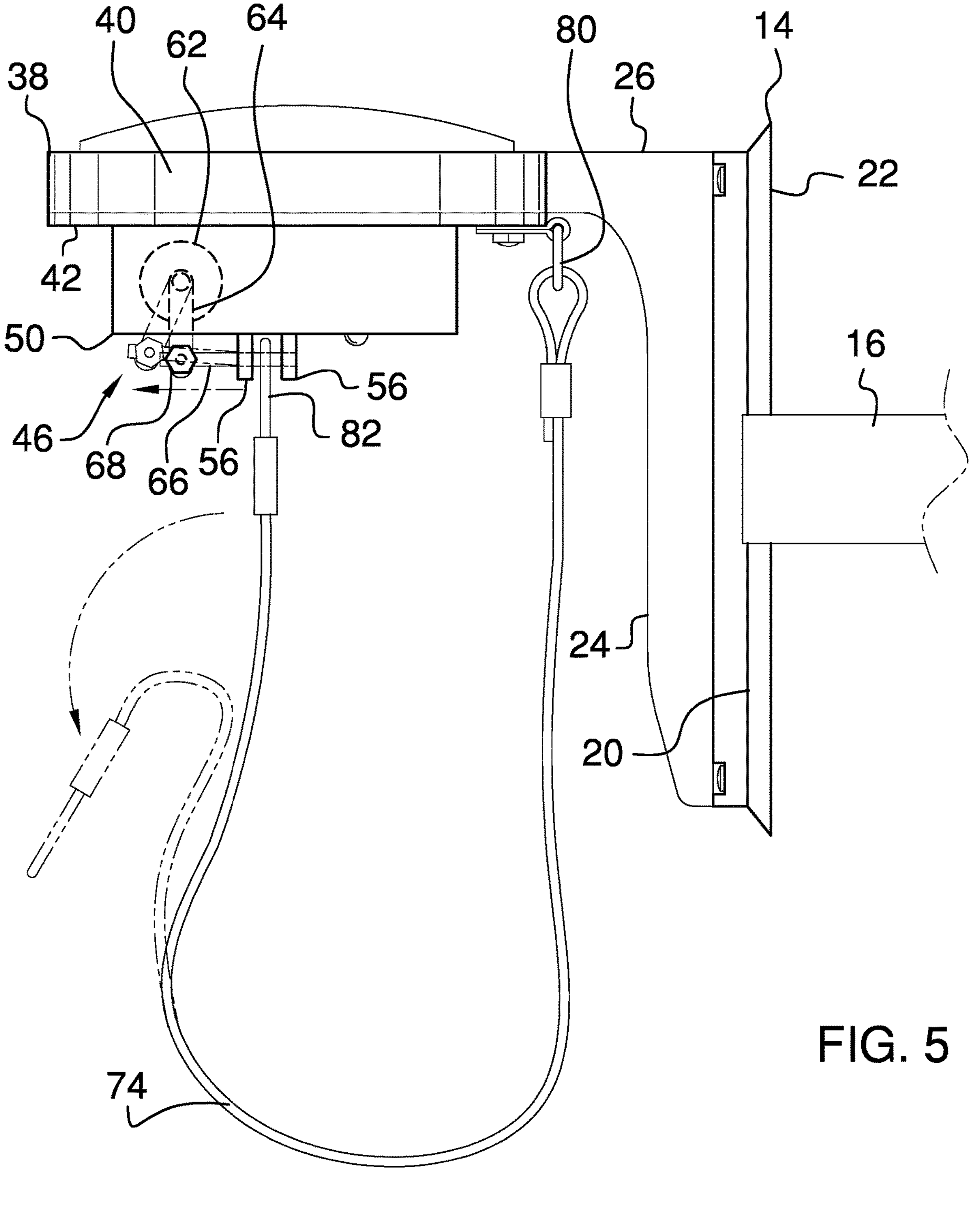
FIG. 5 is a left side view of an embodiment of the disclosure.

With reference now to the drawings, and in particular to FIGS. 1 through 5 thereof, a new tag line device embodying the principles and concepts of an embodiment of the disclosure and generally designated by the reference numeral 10 will be described.

As best illustrated in FIGS. 1 through 5, the tag line release assembly 10 generally comprises a mount 12 which includes a panel 14 and a strap 16 attached to the panel 14 thereby facilitating the panel 14 to be positioned against a load 17 that is being lifted by a crane 18. The strap 16 is wrapped around the load 17 to secure the panel 14 against the load 17. The load 17 may be construction materials, for example, and the crane 18 may be a crane of any conventional design employed on a construction site, for example. The panel 14 has a front side 20 and a back side 22 and the mount 12 has a foot 24 that is disposed on the front side 20 of the panel 14. The foot 24 has a leg 26 that is perpendicularly oriented with the foot 24. The strap 16 has a first end 28 and a second end 30 and each of the first end 28 and the second end 30 is coupled to a respective one of a first lateral side 32 and a second lateral side 34 of the foot 24. In this way the strap 16 forms a closed loop which extends around the back side 22 of the panel 14. The strap 16 has an adjuster 36 that is disposed on the strap 16 for adjusting a diameter of the closed loop formed by the strap 16 thereby facilitating the strap 16 to be tightened around the load 17.

A disk 38 is disposed on the mount 12 and the disk 38 is oriented to lie on a plane that is perpendicularly oriented with the panel 14 such that the disk 38 extends away from the load 17 when the mount 12 is attached to the load 17. The disk 38 has a perimeter edge 40 and a lower surface 42 and the perimeter edge 40 is attached to a distal end 44 of the leg 26. A release unit 46 is attached to the disk 38 and the release unit 46 is in remote communication with a remote control 48. Furthermore, the remote control 48 can remotely actuate the release unit 46 between an actuated condition and a de-actuated condition.

The release unit 46 comprises a housing 50 that is attached to the lower surface 42 of the disk 38 and the housing 50 has an opening 52 extending through a bottom wall 54 of the housing 50. A pair of fins 56 is each attached to the housing 50, each of the fins 56 extends outwardly through the opening 52 in the bottom wall 54 and the fins 56 are spaced apart from each other. A control circuit 58 is positioned in the housing 50 and the control circuit 58 receives an unlock input and a lock input. A transceiver 60 is positioned in the housing 50, the transceiver 60 is electrically coupled to the control circuit 58 and the transceiver 60 is in wireless communication with the remote control 48. The control circuit 58 receives the unlock input when the transceiver 60 receives an unlock command from the remote control 48. Additionally, the control circuit 58 receives the lock input when the transceiver 60 receives a lock command from the remote control 48. The transceiver 60 may comprise a radio frequency transceiver or the like and the transceiver 60 may employ Bluetooth communication protocols. Furthermore, the remote control 48 may comprise a personal electronic device, such as a smart phone for example, or other similar device that has wireless communication capabilities.

An actuator 62 is movably integrated into the housing 50 and the actuator 62 is electrically coupled to the control circuit 58. The actuator 62 includes an arm 64 extending outwardly through the opening 52 in the bottom wall 54 of the housing 50 and the actuator 62 includes a pin 66 that is attached to a distal end 68 of the arm 64. The pin 66 is oriented to be extendable through each of the fins 56. The actuator 62 pivots the arm 64 in a first direction when the control circuit 58 receives the unlock input such that the pin 66 does not extend through the pair of fins 56. Conversely, the actuator 62 pivots the arm 64 in a second direction when the control circuit 58 receives the lock input such that the pin 66 does extend through the pair of fins 56. The actuator 62 may comprise a two direction electric motor, an electromechanical linear actuator or other similar type of mechanism which can pivot the arm 64.

A light emitter 70 is coupled to the bottom wall 54 of the housing 50 to emit light outwardly from the bottom wall 54 of the housing 50. The light emitter 70 is electrically coupled to the control circuit 58 and the light emitter 70 is turned on the when the control circuit 58 receives the unlock input. The light emitter 70 may comprise a light emitting diode or other similar type of electronic light emitter. A power supply 72 is positioned in the housing 50, the power supply 72 is electrically coupled to the control circuit 58 and the power supply 72 comprises at least one battery.

A cord 74 is attached to the disk 38 and the cord 74 engages the release unit 46 such that the cord 74 forms a closed loop between the disk 38 and the release unit 46. In this way a tag line 76 can be looped around the cord 74 such that the cord 74 inhibits the tag line 76 from becoming tangled while the load 17 is being maneuvered by the crane 18. Thus, the load 17 can be safely maneuvered with the crane 18 without requiring the crane operator to be mindful of the tag line 76. The cord 74 is released from the release unit 46 when the release unit 46 is actuated into the actuated condition. In this way the tag line 76 is dropped to facilitate a ground based worker 78 to hold the tag line 76 for guiding the load 17 when the load 17 is being lowered by the crane 18. In this way the tag line 76 facilitates the load 17 to be safely and accurately lowered in the presence of a cross wind, for example, or to guide the load 17 around objects on the ground.

The cord 74 is secured to an attachment 80 which is disposed on the lower surface 42 of the disk 38. The cord 74 is looped onto itself adjacent to a first end 81 of the cord 74 to define a loop 82 in the cord 74. The loop 82 in the cord 74 is positioned between the pair of fins 56 associated with the release unit 46 such that the pin 66 extends through the loop 82 in the cord 74 when the actuator 62 pivots the arm 64 in the second direction. In this way the cord 74 is attached to the release unit 46. The pin 66 is pulled out of the loop 82 in the cord 74 when the actuator 62 pivots the arm 64 in the first direction thereby releasing the cord 74 from the release unit 46.

In use, the strap 16 is secured around the load 17 while the load 17 is resting on the ground, the tag line 76 is secured to the load 17, the cord 74 is secured to the release unit 46 and the tag line 76 is looped around the cord 74. The load 17 is lifted with the crane 18 to facilitate the load 17 to be maneuvered over a drop point. Furthermore, the tag line 76 is inhibited from becoming tangled while the crane 18 is maneuvering the load 17. The remote control 48 is employed to actuate the release unit 46 to release the cord 74 to subsequently facilitate the tag line 76 to fall to the ground based worker 78. In this way the ground based worker 78 can grip the tag line 76 to guide the load 17 while the crane 18 is lowering the load 17. Thus, the load 17 can be safely and accurately lowered onto the drop point. The strap 16 and the tag line 76 are removed from the load 17 once the load 17 has been lowered onto the drop point.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tag line release assembly for releasing a tag line from a load when the load is being transported by a crane, said assembly comprising:

a mount comprising a panel and a strap attached to the panel thereby facilitating said panel to be positioned against a load being lifted by a crane having said strap being wrapped around the load to secure said panel against the load;

a disk being disposed on said mount, said disk being oriented to lie on a plane being perpendicularly oriented with said panel such that said disk extends away from the load when said mount is attached to the load;

a release unit being attached to said disk, said release unit being in remote communication with a remote control thereby facilitating said remote control to remotely actuate said release unit between an actuated condition and a de-actuated condition; and a cord being attached to said disk, said cord engaging said release unit such that said cord forms a closed loop between said disk and said release unit thereby facilitating a tag line to be looped around said cord wherein said cord is configured to inhibit the tag line from becoming tangled while the load is being maneuvered by the crane, said cord being released from said release unit when said release unit is actuated into said actuated condition thereby facilitating the tag line to be dropped wherein said cord is configured to facilitate a ground based worker to hold the tag line for guiding the load when the load is being lowered by the crane.

2. The assembly according to claim 1, wherein:

said panel has a front side and a back side, said mount having a foot being disposed on said front side of said panel, said foot having a leg being perpendicularly oriented with said foot;

said strap has a first end and a second end, each of said first end and said second end being coupled to a respective one of a first lateral side and a second lateral side of said foot such that said strap forms a closed loop extending around said back side of said panel;

said strap has an adjuster being disposed on said strap for adjusting a diameter of said closed loop formed by said strap thereby facilitating said strap to be tightened around the load; and said disk has a perimeter edge and a lower surface, said perimeter edge being attached to a distal end of said leg.

3. The assembly according to claim 2, wherein said release unit comprises:

a housing being attached to said lower surface of said disk, said housing having an opening extending through a bottom wall of said housing; and a pair of fins, each of said fins being attached to said housing, each of said fins extending outwardly through said opening in said bottom wall, said fins being spaced apart from each other.

4. The assembly according to claim 3, wherein said release unit includes:

a control circuit being positioned in said housing, said control circuit receiving an unlock input and a lock input; and a transceiver being positioned in said housing, said transceiver being electrically coupled to said control circuit, said transceiver being in wireless communication with said remote control, said control circuit receiving said unlock input when said transceiver receives an unlock command from said remote control, said control circuit receiving said lock input when said transceiver receives a lock command from said remote control.

5. The assembly according to claim 4, wherein:

said release unit includes an actuator being movably integrated into said housing, said actuator being electrically coupled to said control circuit;

said actuator includes an arm extending outwardly through said opening in said bottom wall of said housing;

said actuator includes a pin being attached to a distal end of said arm, said pin positioned to be extendable through each of said fins;

said actuator pivots said arm in a first direction when said control circuit receives said unlock input such that said pin does not extend through said pair of fins; and said actuator pivots said arm in a second direction when said control circuit receives said lock input such that said pin extends through said pair of fins.

6. The assembly according to claim 5, wherein said cord is secured to an attachment being disposed on said lower surface of said disk, said cord being looped onto itself adjacent to a first end of said cord to define a loop in said cord, said loop in said cord being positioned between said pair of fins associated with said release unit such that said pin extends through said loop in said cord when said actuator pivots said arm in said second direction for attaching said cord to said release unit, said pin being pulled out of said loop in said cord when said actuator pivots said arm in said first direction thereby releasing said cord from said release unit.

7. The assembly according to claim 4, further comprising:

a light emitter being coupled to said bottom wall of said housing wherein said light emitter is configured to emit light outwardly from said bottom wall of said housing, said light emitter being electrically coupled to said control circuit, said light emitter being turned on said when said control circuit receives said unlock input; and a power supply being positioned in said housing, said power supply being electrically coupled to said control circuit, said power supply comprising at least one battery.

8. A tag line release assembly for releasing a tag line from a load when the load is being transported by a crane, said assembly comprising:

a mount comprising a panel and a strap attached to the panel thereby facilitating said panel to be positioned against a load being lifted by a crane having said strap being wrapped around the load to secure said panel against the load, said panel having a front side and a back side, said mount having a foot being disposed on said front side of said panel, said foot having a leg being perpendicularly oriented with said foot, said strap having a first end and a second end, each of said first end and said second end being coupled to a respective one of a first lateral side and a second lateral side of said foot such that said strap forms a closed loop extending around said back side of said panel, said strap having an adjuster being disposed on said strap for adjusting a diameter of said closed loop formed by said strap thereby facilitating said strap to be tightened around the load;

a disk being disposed on said mount, said disk being oriented to lie on a plane being perpendicularly oriented with said panel such that said disk extends away from the load when said mount is attached to the load, said disk having a perimeter edge and a lower surface, said perimeter edge being attached to a distal end of said leg;

a release unit being attached to said disk, said release unit being in remote communication with a remote control thereby facilitating said remote control to remotely actuate said release unit between an actuated condition and a de-actuated condition, said release unit comprising:

a housing being attached to said lower surface of said disk, said housing having an opening extending through a bottom wall of said housing;

a pair of fins, each of said fins being attached to said housing, each of said fins extending outwardly through said opening in said bottom wall, said fins being spaced apart from each other;

a control circuit being positioned in said housing, said control circuit receiving an unlock input and a lock input;

a transceiver being positioned in said housing, said transceiver being electrically coupled to said control circuit, said transceiver being in wireless communication with said remote control, said control circuit receiving said unlock input when said transceiver receives an unlock command from said remote control, said control circuit receiving said lock input when said transceiver receives a lock command from said remote control;

an actuator being movably integrated into said housing, said actuator being electrically coupled to said control circuit, said actuator including an arm extending outwardly through said opening in said bottom wall of said housing, said actuator including a pin being attached to a distal end of said arm, said pin positioned to be extendable through each of said fins, said actuator pivoting said arm in a first direction when said control circuit receives said unlock input such that said pin does not extend through said pair of fins, said actuator pivoting said arm in a second direction when said control circuit receives said lock input such that said pin extends through said pair of fins;

a light emitter being coupled to said bottom wall of said housing wherein said light emitter is configured to emit light outwardly from said bottom wall of said housing, said light emitter being electrically coupled to said control circuit, said light emitter being turned on said when said control circuit receives said unlock input; and a power supply being positioned in said housing, said power supply being electrically coupled to said control circuit, said power supply comprising at least one battery; and a cord being attached to said disk, said cord engaging said release unit such that said cord forms a closed loop between said disk and said release unit thereby facilitating a tag line to be looped around said cord wherein said cord is configured to inhibit the tag line from becoming tangled while the load is being maneuvered by the crane, said cord being released from said release unit when said release unit is actuated into said actuated condition thereby facilitating the tag line to be dropped wherein said cord is configured to facilitate a ground based worker to hold the tag line for guiding the load when the load is being lowered by the crane, said cord being secured to an attachment being disposed on said lower surface of said disk, said cord being looped onto itself adjacent to a first end of said cord to define a loop in said cord, said loop in said cord being positioned between said pair of fins associated with said release unit such that said pin extends through said loop in said cord when said actuator pivots said arm in said second direction for attaching said cord to said release unit, said pin being pulled out of said loop in said cord when said actuator pivots said arm in said first direction thereby releasing said cord from said release unit.

* * * * *